US009232109B2

(12) United States Patent
Suwa et al.

(10) Patent No.: US 9,232,109 B2
(45) Date of Patent: Jan. 5, 2016

(54) IMAGE PROCESSING APPARATUS AND IMAGE PROCESSING METHOD SPECIFYING A TYPE OF ORIGINAL BASED ON WHETHER A HIGH FREQUENCY COMPONENT IS INCLUDED IN AN ACQUIRED SPATIAL FREQUENCY FEATURE INCLUDING A FEATURE OF FIBER OF AN ORIGINAL

(71) Applicant: CANON KABUSHIKI KAISHA, Tokyo (JP)

(72) Inventors: Tetsuya Suwa, Yokohama (JP); Yugo Mochizuki, Kawasaki (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/464,944

(22) Filed: Aug. 21, 2014

(65) Prior Publication Data
US 2015/0055201 A1    Feb. 26, 2015

(30) Foreign Application Priority Data
Aug. 26, 2013 (JP) .................................. 2013-174717

(51) Int. Cl.
G03F 3/08 (2006.01)
H04N 1/409 (2006.01)
G06K 15/00 (2006.01)
H04N 1/46 (2006.01)
H04N 1/405 (2006.01)
G06K 9/00 (2006.01)
G06K 9/48 (2006.01)

(52) U.S. Cl.
CPC .................................. *H04N 1/4097* (2013.01)

(58) Field of Classification Search
CPC ........................... H04N 1/6077; H04N 1/6019
See application file for complete search history.

(56) References Cited

U.S. PATENT DOCUMENTS

| 5,721,812 | A | 2/1998 | Mochizuki |
| 6,292,621 | B1 | 9/2001 | Tanaka et al. |
| 6,608,926 | B1 | 8/2003 | Suwa et al. |
| 6,694,051 | B1 * | 2/2004 | Yamazoe et al. .............. 382/167 |
| 7,336,394 | B2 | 2/2008 | Tsujimoto |
| 7,432,985 | B2 | 10/2008 | Ishikawa et al. |
| 7,924,469 | B2 | 4/2011 | Ono et al. |
| 7,944,588 | B2 | 5/2011 | Yamada et al. |
| 8,175,155 | B2 | 5/2012 | Suwa et al. |

(Continued)

FOREIGN PATENT DOCUMENTS

JP      2004-042370 A      2/2004

OTHER PUBLICATIONS

U.S. Appl. No. 14/464,987, filed Aug. 21, 2014.

*Primary Examiner* — Barbara Reinier
*Assistant Examiner* — Henok A Shiferaw
(74) *Attorney, Agent, or Firm* — Fitzpatrick, Cella, Harper & Scinto

(57) ABSTRACT

Because the spectral characteristics of an original of a printing sheet and those of an original of a photographic image are different, in the case where the same color conversion table is applied at the time of color conversion processing, a deviation occurs in color reproducibility. By determining the sheet type with accuracy based on the feature of fiber that occurs in manufacture of paper and by applying color conversion processing in accordance with the determination result, a highly accurate color reproduction method of an image is implemented.

18 Claims, 12 Drawing Sheets

(56) References Cited

U.S. PATENT DOCUMENTS

| | | |
|---|---|---|
| 8,237,991 B2 | 8/2012 | Ono et al. |
| 8,320,696 B2 | 11/2012 | Yamamoto et al. |
| 2004/0008869 A1* | 1/2004 | Tsujimoto ................ 382/108 |
| 2009/0148062 A1* | 6/2009 | Gabso et al. ............. 382/266 |
| 2010/0157350 A1* | 6/2010 | Yoshihara et al. .......... 358/1.14 |
| 2014/0010415 A1 | 1/2014 | Kunieda et al. |
| 2014/0010442 A1 | 1/2014 | Kato et al. |
| 2014/0010450 A1 | 1/2014 | Suwa et al. |
| 2014/0198354 A1 | 7/2014 | Akiba et al. |
| 2015/0029520 A1* | 1/2015 | Itoh ............................ 358/1.1 |

* cited by examiner

IMAGE PROCESSING APPARATUS AND
IMAGE PROCESSING METHOD
SPECIFYING A TYPE OF ORIGINAL BASED
ON WHETHER A HIGH FREQUENCY
COMPONENT IS INCLUDED IN AN
ACQUIRED SPATIAL FREQUENCY FEATURE
INCLUDING A FEATURE OF FIBER OF AN
ORIGINAL

BACKGROUND OF THE INVENTION

1. Field of the Invention

The present invention relates to an image processing apparatus for determining the type of an original and an image processing method.

2. Description of the Related Art

A scanner is used widely, which reads a target original by irradiating the original with light from a light source, reading a reflected signal value, and forming an image. As an original a user causes a scanner to read, mention is made of various originals, such as paper on which a photo is printed, printed matter, such as a magazine and a map, and a general written original. Because of this, it becomes necessary to determine the type of an original.

For example, the problem of color reproducibility at the time of scanning various kinds of originals is widely known. The spectral sensitivity of observation by human eyes and the spectral sensitivity of a scanner reading an original do not agree with each other. Because of this, color reproduction is performed by performing color conversion processing so as to match the sensitivity of a scanner scanning an original image with the sensitivity of human eyes. However, in the case where color conversion processing is performed on originals of the same type having the same spectral characteristics, there arises no problem, but in the case where the same color conversion processing is performed on various kinds of originals having different spectral characteristics, a deviation occurs in color reproducibility.

In particular, the spectral characteristics of an original of a printing sheet, such as plain paper are quite different from those of an original of a photographic sheet, such as glossy paper, and therefore, in the case where the same conversion table is applied in color conversion processing, a large deviation occurs in color reproducibility. For example, despite having created a color conversion table that is adjusted to an original of a printing sheet, in the case where the color conversion table is applied to an original of a photographic sheet, the result of color reproduction will be that a color difference ΔE is 7 or more on average. Because of this, it is necessary to accurately discriminate between an original of a photographic sheet and an original of a printing sheet and to perform color conversion processing in accordance with the type of the original in order to prevent a deviation in color reproducibility from occurring.

As an original-type determining method, there is a method in which the surface condition of a paper surface is read and a determination is performed based on the surface roughness and the surface shape (see Japanese Patent Laid-Open No. 2004-042370). Specifically, by taking the depth of the surface irregularities to be a feature of the surface roughness and the period of the surface irregularities to be a feature of the surface shape, the type of an original is determined by paying attention to these features. In general, plain paper has the features that the surface irregularities are deep and the period of irregularities is short. For these features, detection of the period of irregularities by utilizing a run-length and the number of times of change, Ra measurement, and estimation of the depth of irregularities by a histogram are performed.

However, Japanese Patent Laid-Open No. 2004-042370 has not taken into consideration the directional properties of fiber, etc. Further, there is a case where, for example, an original is placed in various directions with respect to an original table. Because of this, in a read image, the direction of fiber of the paper can take various directions as a result and in this case, the period of the irregularities of the paper surface may also be different depending on the direction of fiber. However, Japanese Patent Laid-Open No. 2004-042370 has not taken into consideration the directional properties of fiber as described above, and therefore, there is a case where an erroneous determination of an original is caused because the run-length or the number of times of change beyond expectation is detected. In particular, an erroneous determination due to the influence of the directional properties of fiber is easily caused between coated paper and glossy paper whose features, such as the surface roughness and surface shape, are close to each other.

SUMMARY OF THE INVENTION

An object of the present invention is to provide an image processing apparatus capable of accurately determining the type of a sheet based on the direction of fiber of the paper.

According to a first aspect of the present invention, there is provided an image processing apparatus comprising: an acquisition unit configured to acquire a spatial frequency feature indicating a feature of fiber of an original in an read image obtained by a reading device reading the original; and a determination unit configured to determine a type of the original based on the spatial frequency feature acquired by the acquisition unit.

According to a first aspect of the present invention, there is provided an image processing method comprising: an acquisition step of acquiring a spatial frequency feature indicating a feature of fiber of an original in a read image obtained by a reading device reading the original; and a determination step of determining a type of the original based on the spatial frequency feature acquired in the acquisition step.

Further features of the present invention will become apparent from the following description of exemplary embodiments (with reference to the attached drawings)

DESCRIPTION OF THE EMBODIMENTS

Hereinafter, with reference to drawings, preferred embodiments of the present invention are explained in detail in an illustrative manner. However, the components described in the embodiments are only illustrative and are not intended to limit the scope of the present invention only to those.

First, terms in the present specification are explained. The original types include the types of sheets described below.

The printing sheet refers to plain paper used in a copier for duplicating an original, in addition to paper used in general catalogues and magazines. The printing sheet is used in offset printing or used in the setting of plain paper in an inkjet printer and a laser printer. Paper whose surface is coated with calcium nitrate (coated paper) due to the recent improvement of plain paper is also included in the above-described printing sheet.

The photographic sheet includes glossy paper used in photographic printing of an inkjet printer, in addition to photographic paper used in the silver halide system.

In the present embodiments, an original that uses the printing sheet is called a printing original and an original that uses the photographic sheet is called as a photographic image.

First Embodiment

Figure 1:
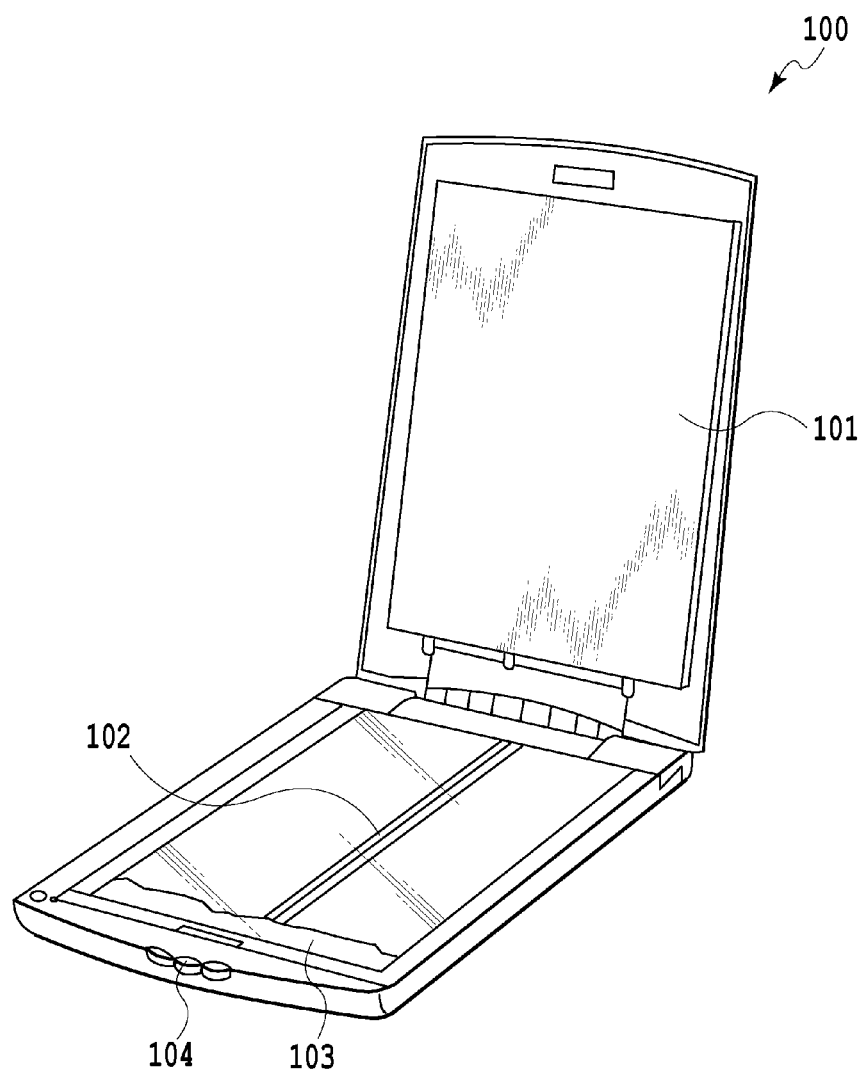
FIG. 1 is a perspective view of an outline of a reading device.

<Configuration of reading device> FIG. 1 is a perspective view of an outline of a reading device 100 according to the present embodiment. As shown in FIG. 1, the reading device 100 includes an original table cover 101 to hold down a set original, an original table on which to place an original, and an original reading unit 103 configured to read a set original. In the case where a user places an original on the original table 102, closes the original table cover 101, and presses down a scanner button key (not shown), the original reading unit 103 starts reading of an original. The original reading unit 103 is driven by a motor (not shown) and reads an original to detect a reflected signal by a light source and a sensor (not shown) installed within the original reading unit 103.

Figure 2:
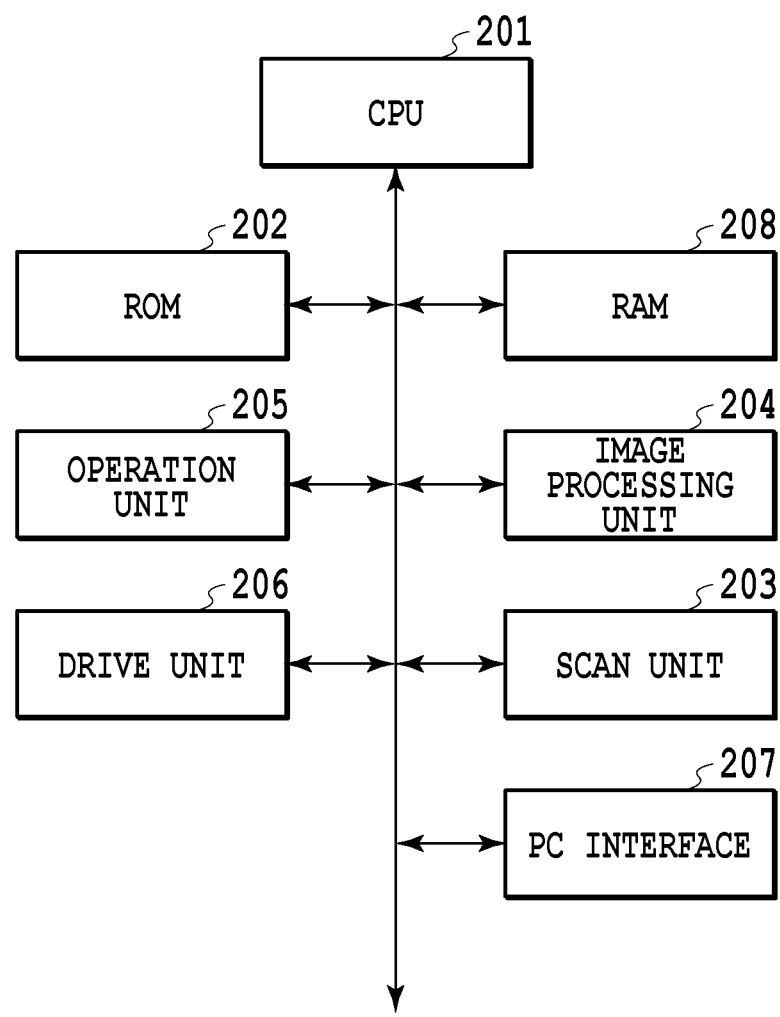
FIG. 2 is a block diagram showing an internal configuration of the reading device.

FIG. 2 is a block diagram showing an internal configuration of the reading device 100. In FIG. 2, a CPU 201 controls the operation of the reading device 100. A ROM 202 stores various kinds of programs to cause the CPU 201 to perform control and to cause each of the other units to operate. For example, programs corresponding to the processing in the flowcharts shown in FIGS. 4, 5, 7, 8, and 11, to be described later, are stored in the ROM 202. Then, by the CPU 201 executing the programs, it is possible to implement the processing to be explained in the above-mentioned flowcharts. Further, in the ROM 202, various values, tables, and mathematical expressions used in image processing, such as shading correction, to be described later, are stored. A scan unit 203 is configured to read an original image, digitize the acquired read signal values (analog luminance data of red (R), green (G), and blue (B)) by AD conversion, and output them. An image processing unit 204 performs image processing, such as correcting the read signal values digitized by AD conversion and coding of an image. In the case where temporary storage of data is necessary at the time of image processing, a RAM 208 is used. An operation unit 205 comprises a scanner button key and detects a pressed-down state of the key and transmits instructions to each unit. A drive unit 206 includes a driver circuit, etc., configured to perform motor control to operate the scan unit 203. A PC interface 207 is an interface with a PC and the reading device 100 performs a data transfer with a PC via the PC interface 207. In the case where a buffer is necessary at the time of transfer, the RAM 208 is used.

Figure 3:
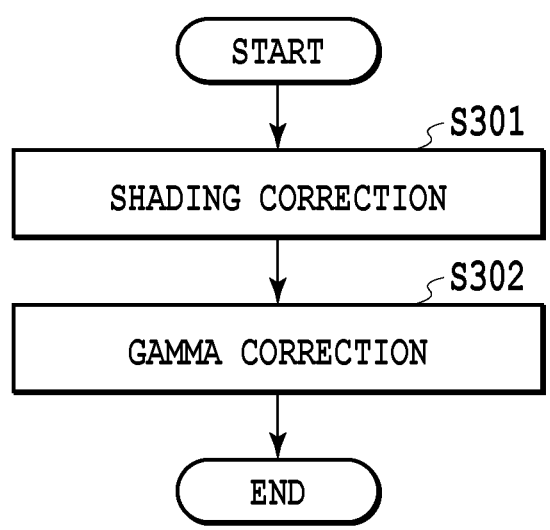
FIG. 3 is a flowchart of general image processing in the reading device.

FIG. 3 is a flowchart of image processing performed in the image processing unit 204 of the reading device 100.

At step S301, the image processing unit 204 makes a shading correction of the image data read by the scan unit 203 and subjected to AD conversion. In the shading correction, a white reference and a black reference prepared in advance are read, correction is made from read values for each image capturing element, and variations of the image capturing elements in the scan unit 203 are corrected.

At step S302, the image processing unit 204 makes a gamma correction for the image data after the shading correction. In the gamma correction, the luminance value is corrected so that the luminance value of the image obtained by the reading device 100 becomes a natural value and this can be done by using a gamma value table stored in advance in the ROM 202.

After the processing at step S302, image data is transferred to the PC via the PC interface 207. Although not described as a step, it may also be possible to compress data in order to reduce the amount of data before transfer. This processing may be processing to appropriately switch between performing compression and not performing compression depending on the transfer rate between the PC and the interface.

In the above-mentioned image processing, in the case where the same image processing is performed on the original image data read by the scan unit 203 without taking the type of original into consideration, there is a possibility that a deviation occurs in color reproducibility. In the present embodiment, by performing an original-type determination processing and color conversion processing in accordance with the determination result, it is made possible to acquire a preferred image. It may be possible to perform the shading correction at step S301 and the gamma correction at step S302 described above before or after the color conversion processing in accordance with the original type of the present embodiment, respectively. In the following, for convenience of explanation, in the flowchart in FIG. 4, the shading correction and gamma correction described above are omitted.

<Original-Type Determination and Color Conversion Processing in Accordance with Original Type>

Figure 4:
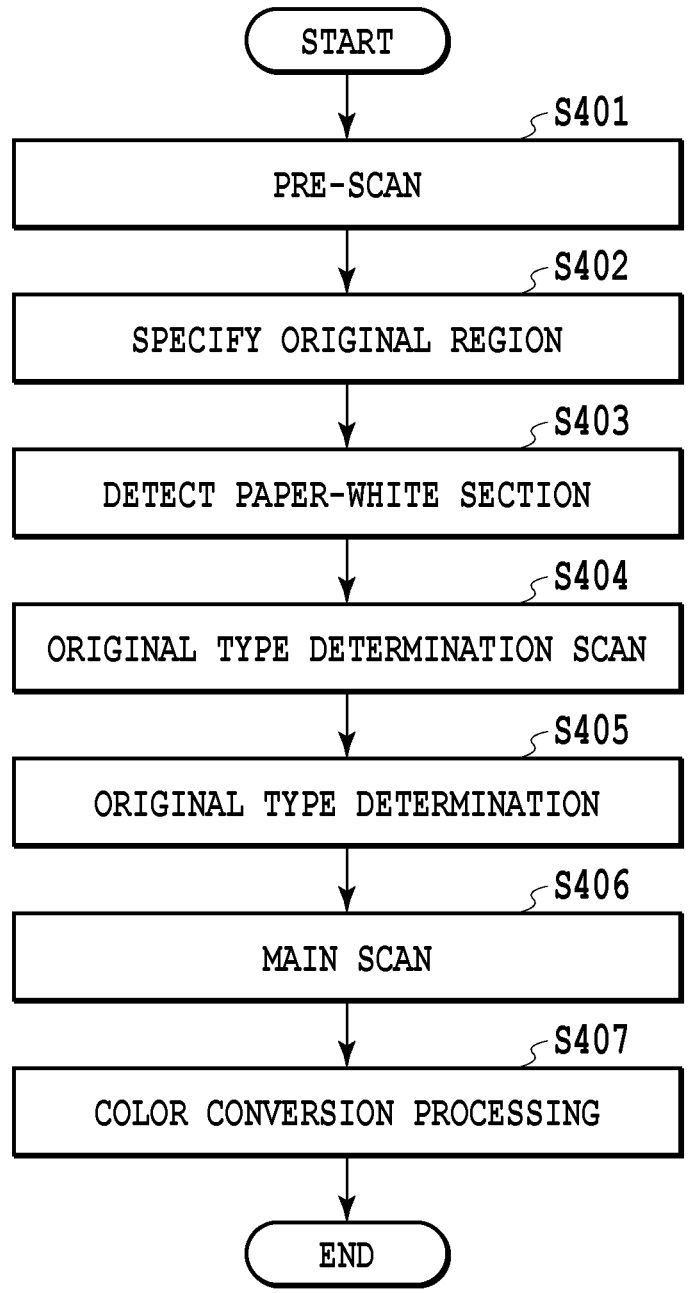
FIG. 4 is a flowchart for performing an original-type determination and color conversion processing according to a first embodiment.

FIG. 4 is a flowchart for performing the original-type determination and color conversion processing of the present embodiment. The processing flow in FIG. 4 is performed by the scan unit 203 and the image processing 204 in accordance with programs stored in the ROM 202.

At step S401, as a pre-scan, the scan unit 203 performs reading of the entire surface of the original table 102. The purpose of this reading step is to specify the region of an original placed on the original table 102 and to detect a portion (hereinafter, paper-white portion) to which any printing material is not applied within the original region. Because of this, the reading may be performed at a resolution as low as about 75 to 150 dpi. It is desirable to be capable of performing the reading operation as fast as possible in view of the operability of a user.

As step S402, the image processing unit 204 specifies the original region from the image read at step S401. As a specifying method, a method can be performed in which the edge part of an original is detected by referring to the pixel values of the surrounding pixels and by determining whether or not the target pixel is at the edge portion. For example, by applying filter processing by, for example, a Laplacian filter, to the RGB signal values of the read image, it is possible to acquire image data in which only the edge portion is enhanced. It may also be possible to specify the original region by combining a determination of lightness, saturation, etc.

At step S403, the image processing unit 204 scans the original region specified at step S402 and detects the paper-white region (a plurality of paper-white sections). As a detecting method, the original region is divided into a predetermined number of sections, an average signal value for each section is calculated, and the paper-white section is determined based on the calculated average signal value. Specifically, in the case where the resolution is 75 dpi, the original region is divided into sections having an area of 1 mm×1 mm, i.e., sections of about 30×30 pixels and the average value (average luminance value) of each of the RGB signal values (i.e., dR, dG, dB) in each section is calculated. In the case where the calculated average values of dR, dG, and dB exceed all predetermined values, the section is determined to be a paper-white section. By performing such determination for all the sections of the original region, the paper-white sections within the original region are detected. It is also possible to perform this determination while shifting the sections in order to make a more accurate detection. It is desirable to set the amount of shift to an amount by which the operability is not lost while observing the processing rate.

The paper-white section detected at step S403 is stored as coordinate values (X, Y). In the case where no section is determined to be a paper-white section, for example, the coordinate values are set to (−1, −1) etc. as a signal indicative of no detection for distinction. For the detected paper-white section, it may also be possible to store the calculated average values of dR, dG, and dB (dRAVE, dGAVE, dBAVE) together with the coordinate values. In other words, the detected paper-white section is stored as (X, Y, dRAVE, dGAVE, dBAVE). Due to this, it is made possible to efficiently perform the original-type determination, to be described later.

At step S404, as a scan for the original-type determination, the scan unit 203 performs reading of one of the paper-white sections detected at step S403. Because the section to be read at this step is a small region, it is desirable to perform the reading operation at a high resolution here. In the present embodiment, the resolution at the time of reading is set to 1,200 dpi.

At step S405, the image processing unit 204 performs the original-type determination by using image data of 1,200 dpi acquired at step S404. The original-type determination of the present embodiment uses the feature of fiber, and therefore, the original-type determination is performed on the paper-white section from which it is easy to acquire the feature of the fiber of the paper. Details of the original-type determination will be described later. In the case where a plurality of paper-white sections is detected at step S403, it may also be possible to perform the original-type determination for all the paper-white sections by repeatedly performing step S404 and step S405. It may also be possible to select a section whose average values of dR, dG, and dB (dRAVE, dGAVE, dBAVE) are closest to those of the paper-white portion from among the plurality of paper-white sections detected at step S403, i.e., a section in which each average value is highest, and to perform the original-type determination only for the section. In the case of the former, it is possible to perform the determination with higher accuracy and in the case of the latter, it is possible to perform determination with higher efficiency.

At step S406, as a main scan, the scan unit 203 performs reading of an original. The purpose of this step of reading is to acquire an original image to be subjected to color conversion processing. In the reading at this step, the reading operation is performed on the original region specified at step S402 in accordance with the resolution specified by a user.

At step S407, the image processing unit 204 performs color conversion processing in accordance with the type of the original on the RGB signal values (dR, dG, dB) of the original image (read image) read at step S406. The details of the color conversion processing will be described later.

By the above-described method, it is possible to determine the type of an original to be scanned, to perform appropriate color conversion processing in accordance with the original type, and to acquire a preferred image.

<Details of Original-Type Determination>

Figure 7:
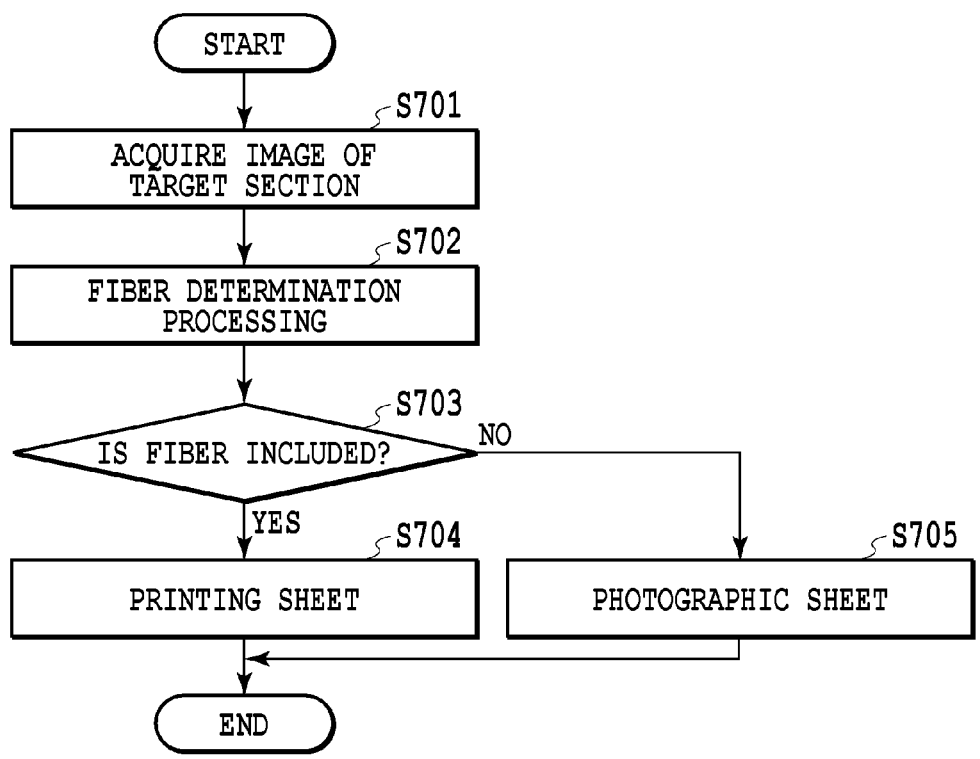
FIG. 7 is a flowchart of an original-type determination according to the first embodiment.

Hereinafter, details of the original-type determination at step S405 are described. FIG. 7 is a flowchart of original-type determination.

At step S701, the image processing unit 204 acquires the image of the paper-white section acquired at step S404.

At step S702, the image processing unit 204 performs fiber determination processing on the paper-white section. The details of the fiber determination processing will be described later.

At step S703, the image processing unit 204 determines whether or not fiber is included in the sheet of the original based on the result of the fiber determination processing at step S702.

In the case where it is determined that fiber is included at step S703, the sheet of the original is determined to be a printing sheet at step S704 and in the case where it is determined that fiber is not included, the sheet of the original is determined to be a photographic sheet at step S705.

Figure 8:
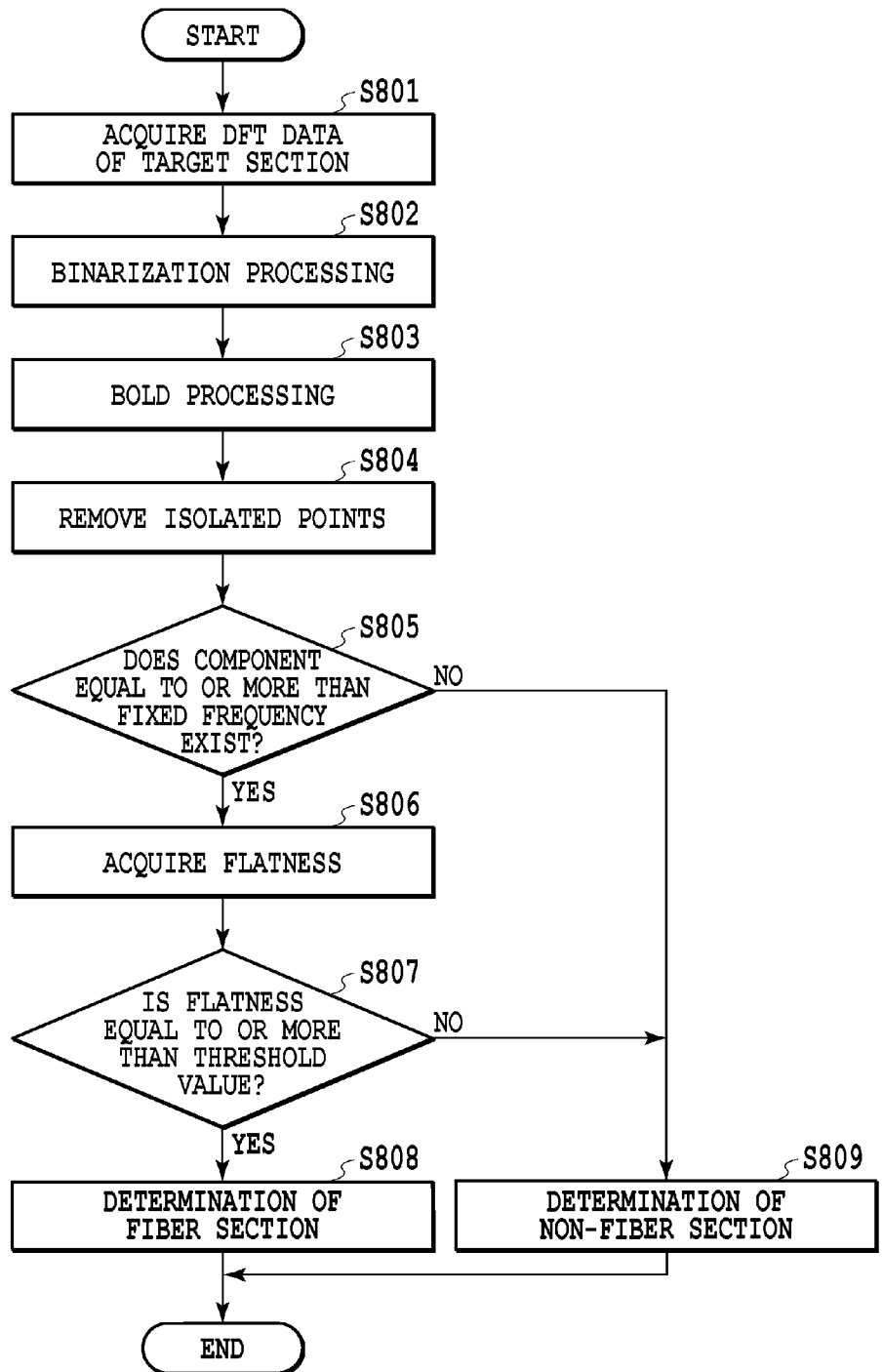
FIG. 8 is a flowchart of fiber determination processing according to the first embodiment.

Hereinafter, details of the fiber determination processing at step S702 are described. FIG. 8 is a flowchart of fiber determination processing.

Figure 9A:
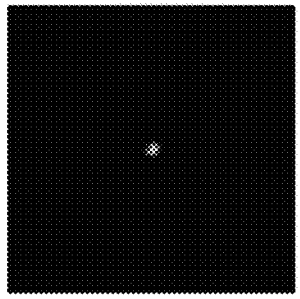
FIGS. 9A to 9E are DFT diagrams of a printing sheet.

At step S801, the image processing unit 204 performs two-dimensional DFT (two-dimensional discrete Fourier transformation) processing on the image data of the paper-white section and generates a spatial frequency image (DFT diagram). By performing two-dimensional conversion processing, an image showing frequency characteristics as in FIG. 9A is obtained. The origin located in the center in FIG. 9A represents a direct-current component, the vertical axis (not shown in FIG. 9A) represents the spatial frequency in the vertical direction, and the horizontal axis (not shown in FIG. 9A) represents the spatial frequency in the horizontal direction. Then, it is indicated that the more distant from the origin both in the horizontal direction and in the vertical direction, the higher the frequency component. The portion represented in white in FIGS. 9A to 9E is a frequency component whose power value (power spectrum) is large and the larger the power value becomes, the whiter the corresponding frequency component is plotted. FIG. 9A shows a conversion example of the paper-white section of the original by offset printing.

Figure 9B:
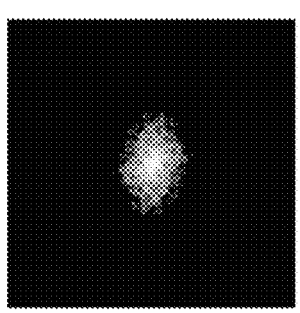

At step S802, the image processing unit 204 performs binarization processing on the spatial frequency image obtained at step S801. As a threshold value for binarization, a value set in advance may be utilized or the threshold value may be determined based on the average value of power values in the spatial frequency image obtained at step S801. The portion whose power value is equal to or more than the threshold value for binarization is a white pixel. FIG. 9B shows an image obtained by performing binarization processing on the spatial frequency image in FIG. 9A.

Figure 9C:
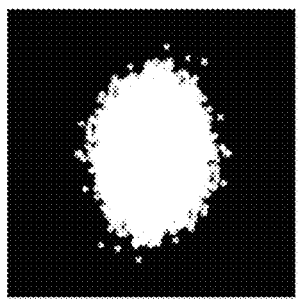

At step S803, the image processing unit 204 performs bold processing to extend the region of the white pixel on the spatial frequency image binarized at step S802. It is possible to perform the bold processing based on a bolding amount set in advance. FIG. 9C shows an image obtained by performing five-pixel bold processing on the white pixel.

Figure 9D:
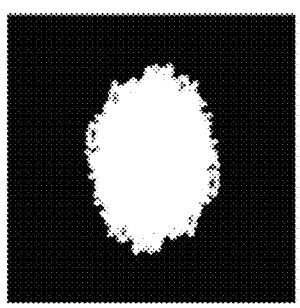

At step S804, the image processing unit 204 further removes isolated points from the image obtained at step S803. The image is scanned and the number of pixels corresponding to the white area is detected, and then, the area whose number of pixels is equal to or less than a threshold value set in advance is painted out with black. The threshold value is set by taking into consideration the bolding amount of the bold processing. In the present embodiment, removal of two to three isolated points is supposed and the threshold value is set to 350 pixels. FIG. 9D shows an image after performing isolated point removal processing.

At step S805 to step S807, the image processing unit 204 performs processing to detect a feature amount of fiber from the image obtained at step S804. Here, the feature of paper fiber is described. The raw material of paper is wood chips and fiber is removed in the pulping process. After the cleaning and bleaching processes, fiber is put side by side with directional properties by a wire part and a press part in the paper making process. As a result of this process, the paper has the feature of grain, such as crosswise grain or lengthwise grain. The size of the fiber depends on the type of the wood material used and is about tens of micrometers×1 to 3 mm in many cases. In other words, the feature of fiber can be said to be that fine lines in a comparatively high density are put side by side with directional properties. This appears with the following tendencies as the feature of the frequency (spatial frequency feature). Feature 1: The fiber comprises fine lines, and therefore, high frequency components are detected. Feature 2: The fiber has directional properties, and therefore, high frequency components have directivity.

In the present embodiment, the image processing unit 204 performs the fiber determination on the image shown in FIG. 9D obtained at step S804 with the above-described features taken into consideration. Step S805 is processing to perform a determination of the above-described feature 1. Step S806 and step S807 are processing steps to perform a determination of the above-described feature 2.

At step S805, the image processing unit 204 determines whether a high frequency component is detected. Here, a frequency component more distant from the origin in the horizontal direction or in the vertical direction by a threshold value or more is taken to be a high frequency component. The threshold value used for this determination is determined in advance. It is desirable to determine the threshold value to be a value with which the feature of fiber can be detected by performing reading for some test sheets including a printing sheet and by performing the two-dimensional DFT processing at step S801 to the isolated point removal processing at step S804. In the case where it is determined that no high frequency component is detected at step S805, the paper-white section is determined to be a non-fiber section at step S809. On the other hand, in the case where it is determined that a high frequency component is detected at step S805, the flow proceeds to step S806.

Figure 9E:
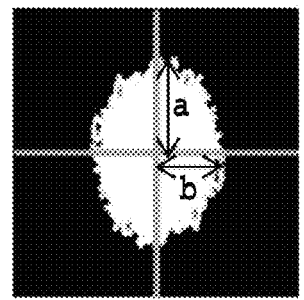

At step S806, the image processing unit 204 calculates a flatness of the image shown in FIG. 9D obtained at step S804. By regarding the white pixel in FIG. 9D as an ellipse (by elliptic approximation), the major axis length a and the minor axis length b are found (FIG. 9E). It is possible to obtain the major axis length a and the minor axis length b by counting the number of pixels. Further, from the obtained major axis length a and the minor axis length b, a flatness f is calculated by using an expression below.

$$f = \frac{a-b}{a}$$

At step S807, the image processing unit 204 determines whether or not the flatness calculated at step S806 is equal to or more than a threshold value. In the case where a flatness equal to or more than the threshold value cannot be detected at this step, the flowchart proceeds to step S809 and the paper-white section is determined to be a non-fiber section. In the case where a flatness equal to or more than the threshold value is detected, it can be thought that the high frequency component has directivity, and therefore, the flow proceeds to step S808 and the paper-white section is determined to be a fiber section. As at step S805, the threshold value used for the determination is determined in advance. It is desirable to determine the threshold value to be a value with which the feature of fiber can be detected by performing reading for some test sheets and by performing the two-dimensional DFT processing at step S801 to the isolated point removal processing at step S804.

By the above processing, it is possible to perform a fiber determination of the paper-white section. In this flow chart, steps S802 to S04 are processing steps to enhance the feature of the spatial frequency image in order to perform efficient fiber determination. Other processing may be used for the processing as long as an equivalent effect can be obtained and the implementation method is not limited.

Figure 10:
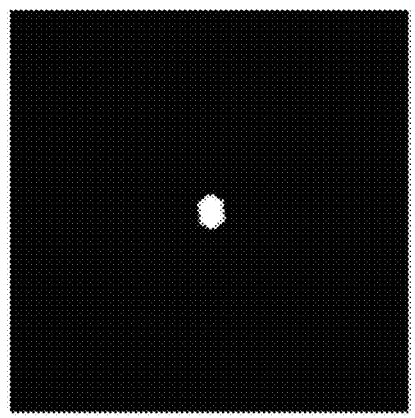
FIG. 10 is a DFT diagram of a photographic sheet.

FIG. 10 shows the result of performing the same processing on a photographic sheet. On the photographic sheet, irregularities in the fiber appear less frequently than the case of a printing sheet, such as plain paper, and therefore, a high value of the spatial frequency is not acquired and the frequency components centralize at low frequencies as shown in FIG. 10. Because of this, by comparison with the image shown in FIG. 9D, it is known that almost all the frequency components exist in the vicinity of the origin and the high frequency component, which is one of the features of fiber, is not seen. Due to this, it is made possible to easily discriminate a photographic sheet from a printing sheet in which the high frequency component is detected.

<Details of Color Conversion Processing>

Hereinafter, details of the color conversion processing at step S407 are described.

At step S407, the image processing unit 204 performs color conversion processing in accordance with the original type on the RGB signal values (dR, dG, dB) of the original image read at step S406. By the color conversion here, the RGB signal values (dR, dG, dB) obtained by reading are converted into RGB values in a desired color space. In the present embodiment, an sRGB color space (sR, sG, sB) that is a color space in which colors are defined and which is one of the standards of monitor display is supposed.

A table in which the RGB signal values (dR, dG, dB) and the sRGB values (sR, sG, sB) are associated is prepared in advance. In the case where values are associated at all the points, the association table becomes very large in size and therefore, converted values (sR, sG, sB) corresponding to (dR, dG, dB) corresponding to discrete lattice points are prepared. Data between lattice points is calculated by using interpolation processing. In the present embodiment, color conversion processing is performed by discriminating between the printing sheet and the photographic sheet, and therefore, two kinds of association tables, i.e., an association table in accordance with the printing sheet and an association table in accordance with the photographic sheet are prepared.

Figure 5:
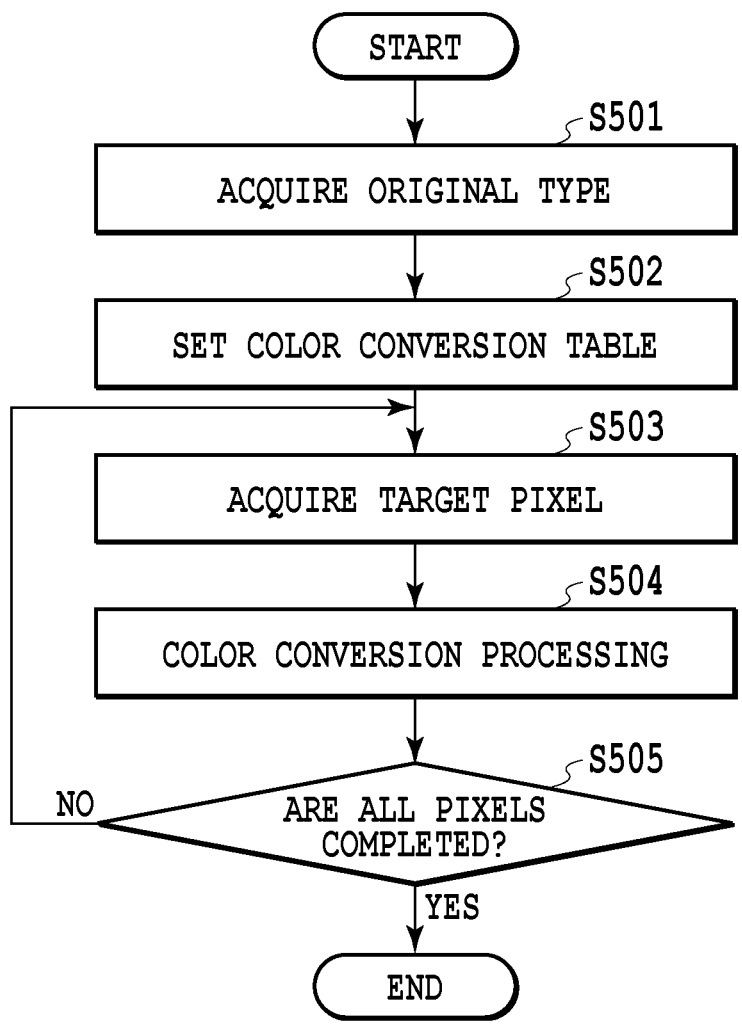
FIG. 5 is a flowchart of color conversion processing according to the first embodiment.

FIG. 5 is a flowchart of color conversion processing of the present embodiment.

At step S501, the image processing unit 204 acquires the original type determined at step S405.

At step S502, the image processing unit 204 sets a color conversion table in accordance with the original type acquired at step S501.

At step S503, the image processing unit 204 acquires the RGB signal values (dR, dG, dB) of the target pixel.

At step S504, the image processing unit 204 performs color conversion processing based on the table set at step S502. In the present embodiment, color conversion processing is performed by using tetrahedron interpolation processing.

Figure 6A:
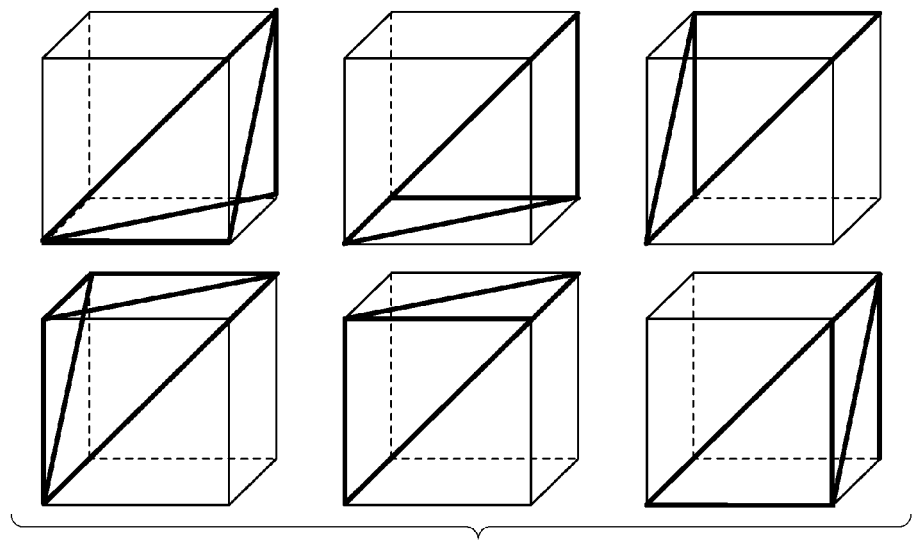
FIGS. 6A and 6B are explanatory diagrams of tetrahedron interpolation according to the first embodiment.
Figure 6B:
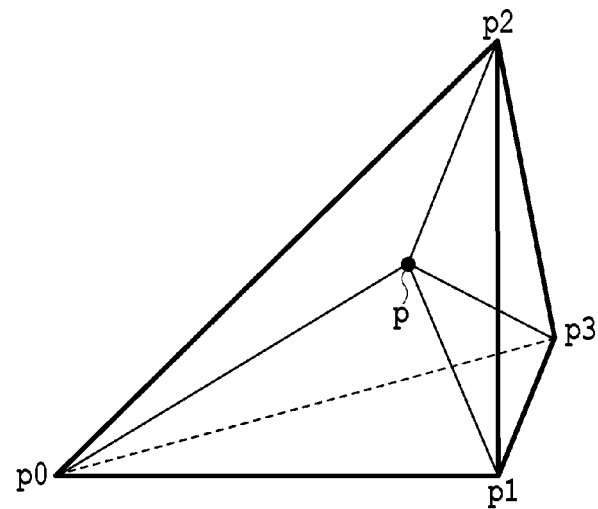

The tetrahedron interpolation of the present embodiment is linear interpolation using four lattice points with a tetrahedron as a unit of division of a three-dimensional space. As the procedure thereof, first, as shown in FIG. 6A, division into tetrahedrons is performed. Then, to which divided tetrahedron a point p corresponding to a target (dR, dG, dB) belongs is determined. The four vertexes of the tetrahedron are taken to be p0, p1, p2, and p3 and the tetrahedron is further divided into smaller tetrahedrons via the point p as shown in FIG. 6B. In the case where the converted value of each vertex in the table set at step S502 is taken to be f(p0), f(p1), f(p2), and f(p3), respectively, the converted value of the point p is calculated by using an expression below.

$$f(p) = \sum_{i=0}^{3} wi \times f(pi) = [w0, w1, w2, w3] \begin{bmatrix} f(p0) \\ f(p1) \\ f(p2) \\ f(p3) \end{bmatrix}$$

Here, w0, w1, w2, and w3 are each a weight for the converted value f(pi) corresponding to each vertex pi, and a volume ratio of the volume of the small tetrahedron at the position opposite to each vertex pi to the volume of the large tetrahedron (p0p1p2p3). For example, w0 is a volume ratio of the volume of the small tetrahedron whose four vertexes are configured by p, p1, p2, and p3 to the volume of the entire tetrahedron whose four vertexes are configured by p0, p1, p2, and p3. By this, conversion into the sRGB values (sR, sG, sB) is carried out.

At step S505, whether color conversion processing is completed on all the pixels is determined and in the case where color conversion processing is not completed yet, the flow chart returns to step S503 and in the case where completed, the processing ends.

By the processing of the present embodiment, it is made possible to accurately determine the type of an original to be read and to appropriately select a color conversion table in accordance with the original type, and therefore, it is possible to provide a preferred image to a user after color conversion.

Second Embodiment

In the present embodiment, a mechanism is provided, in which rough detection to roughly detect a photographic image is performed first by utilizing the fact that the color reproduction range of the photographic image is wider than that of the printing original before the original-type determination of the first embodiment. Due to this, it is possible to avoid the original-type determination based on the feature of fiber of the first embodiment for the photographic image that can be detected by the rough detection of the photographic image. An explanation is provided only for the portions of the second embodiment that are different from those of the first embodiment and for the portions not described in particular, the same examples as those of the first embodiment apply.

Figure 12:
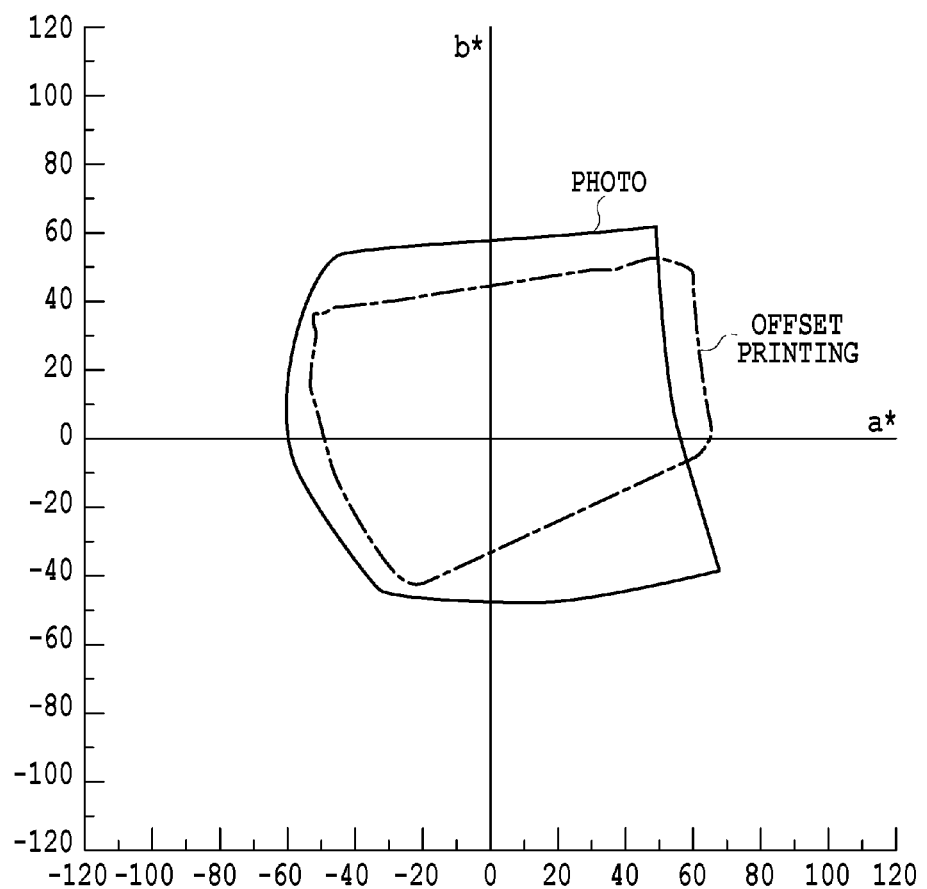
FIG. 12 is an explanatory diagram of a color reproduction range.

FIG. 12 is a diagram showing color reproduction ranges of a printing original and a photographic image. The color reproduction range of a photographic image is indicated by a solid line and the color reproduction range of a printing original is indicated by an alternate long and short dash line. The color reproduction range in FIG. 12 is represented by a section view of $L^*=50$ in the $L^*a^*b^*$ color space. The $L^*a^*b^*$ color space is a color space designed to approximate the human sense of sight and $L^*$ corresponds to lightness of a color, $a^*$ corresponds to a position between red/magenta and green, and $b^*$ corresponds to a position between yellow and blue. As will be seen from FIG. 12, it can be said that the color reproduction range of a photographic image is wider than that of an offset-printing original (printing original), exhibiting more excellent color reproduction. In the present embodiment, rough detection of a photographic image is performed based on the color reproduction range.

Figure 11:
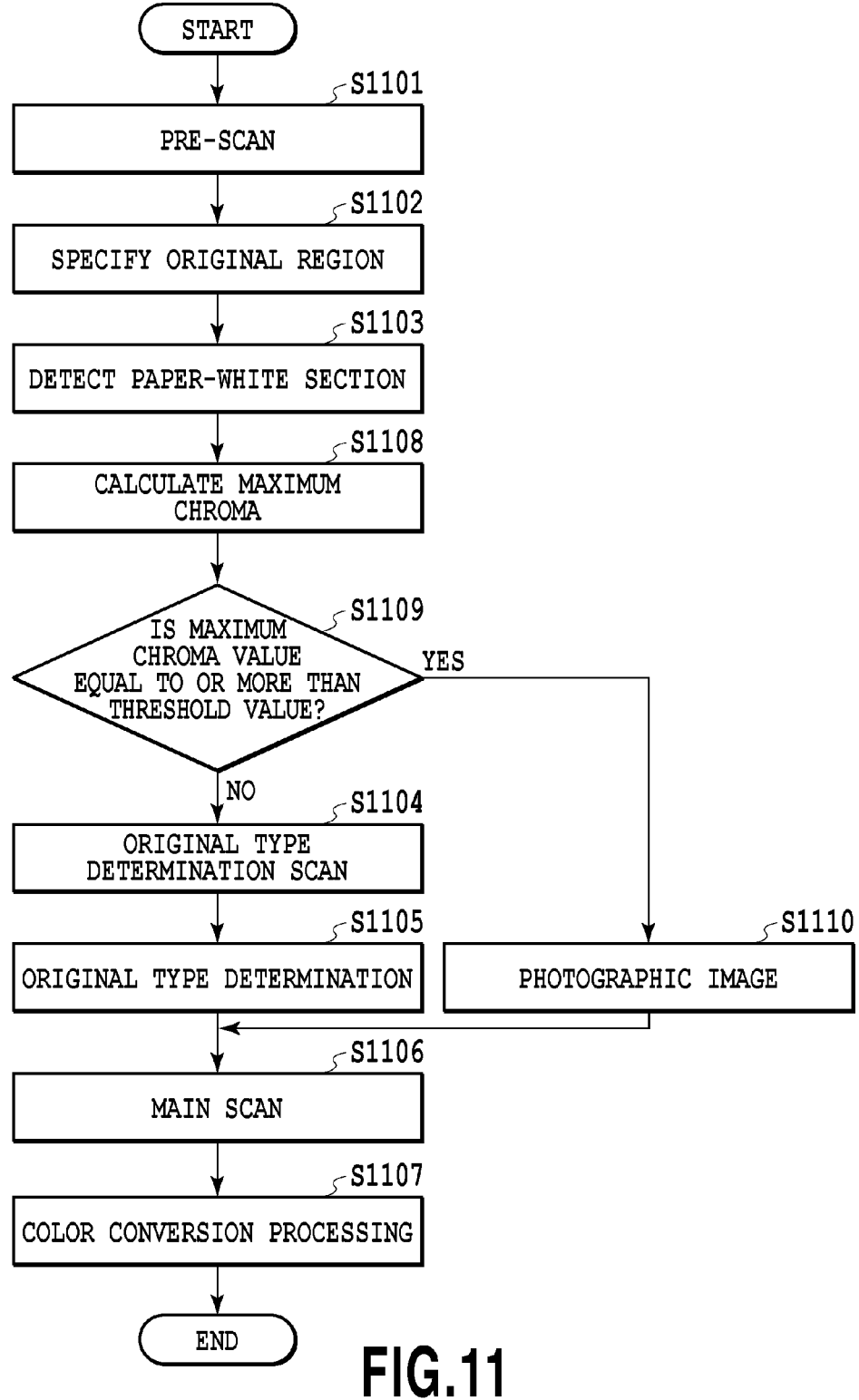
FIG. 11 is an original-type determination flow having taken a saturation into consideration according to a second embodiment.

FIG. 11 is a diagram showing a processing flow of the present embodiment. Step S1101 to step S1107 are the same as step S401 to step S407 in FIG. 4 of the first embodiment, and therefore, a detailed explanation thereof is omitted. Step S1108 to step S1110 are steps relating to rough detection processing of a photographic image according to the present embodiment.

At step S1108, the image processing unit 204 calculates the maximum chroma for the original region specified at step S1102 of the image of a low resolution read at step S1101. For each pixel in the original region, a chroma C is calculated from the RGB signal values (dR, dG, dB) by using an expression below.

$$C = \max(dR, dG, dB) - \min(dR, dG, dB)$$

Here, max (dR, dG, dB) and max (dR, dG, dB) indicate the maximum value and the minimum value, respectively, of dR, dG, and dB. In this manner, the chroma C is calculated for each of all the pixels in the original region. Then, the maximum chroma is acquired by finding the maximum value among the calculated chroma C.

At step S1109, the image processing unit 204 determines whether the maximum chroma calculated at step S1108 is equal to or more than a threshold value set in advance. In the case where it is determined that the maximum chroma is equal to or more than the threshold value, the flow chart proceeds to step S1110. In the case where it is determined that the maximum chroma is less than the threshold value, the flow chart proceeds to step S1104 and step S1105 and the original-type determination based on the feature of fiber is performed.

At step S1110, the image processing unit 204 determines that the original is a photographic image. After that, at step S1106, the main scan of the original is performed and at step S1107, conversion processing in accordance with the photographic image is performed.

As described above, in the case where it is determined that the maximum chroma of the original is equal to or more than the threshold value at step S1109, it is possible to determine that the original is a photographic image at step S1110 without performing the processing at step S1104 and step S1105. The threshold value of the maximum saturation used at step S1109 is determined in advance. It is possible to determine the threshold value of the maximum chroma by finding a chroma value that cannot occur in the case where an offset-printed original is read based on the data in FIG. 12.

In the processing flow shown in FIG. 11, the chroma C is used in order to discriminate between the color reproduction range of a printing original and the color reproduction range of a photographic image, but it is also possible to use luminosity. In general, black in a photographic image is darker and denser than that in a printed original. A luminosity Y is found from the RGB signal values (dR, dG, dB) of the read original by using an expression below.

$$Y=\min(dR, dG, dB)$$

Whether the luminosity Y that is found is a value that cannot occur in a printing original is determined and in the case where the luminosity Y inherent in a photographic image exists, it is possible to similarly determine that the original is a photographic image at step S1110 without performing the processing at step S1104 and step S1105.

In the case where a determination with higher accuracy is desired, it is also possible to hold a determination table by which to determine whether a signal value is one that can occur in a printing original from a combination of the chroma C and the luminosity Y and to perform a determination of a photographic image based thereon.

By the processing of the present embodiment, it is made possible to avoid an original-type determination based on the feature of fiber for a photographic image that can be detected by the photographic image rough detection and the operability in use of a user improves considerably. Further, even in the case where no paper-white section is detected and it is not possible to perform the original-type determination by utilizing the feature of fiber, there is a possibility that the determination can be performed by the photographic image rough detection of the present embodiment.

Other Embodiments

In the first and second embodiments, the example is described, in which color reproducibility improves by determining an original type and by performing color conversion processing in accordance with the determined original type when a scanner is used. In the embodiments, a flat bed scanner is presented, which reads an original put on the original table, but the same processing applies also to a scanner that uses an automatic original reading device called an auto original feeder (hereinafter, ADF). In the case of an ADF, the sensor does not move but the original itself is moved, and therefore, the operation is different in that the original is back-fed after reading an image by a scan other than the main scan, such as the pre-scan at step S401 and the scan for the original-type determination.

It is also possible to apply the present invention to another use that utilizes a scanner. For example, as a device that combines a scanner and a printer as described above and which provides convenience to a user, there is an image duplicating apparatus. In the image duplicating apparatus also, reading processing is performed, and therefore, the application of the present invention is possible. In this case, color reproducibility of a read original is improved, and in addition to this, in the case of a duplicating apparatus with a plurality of cassettes on which a plurality of kinds of sheets used for printing can be set, it is also possible to implement a mechanism to switch cassettes in accordance with the original-type determination. Due to this, it is made possible to implement a mechanism that does not require a user to perform the switching operation to select a printing sheet (plain paper) in the case of a printing original and a photographic sheet in the case of a photographic image.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-174717, filed Aug. 26, 2013, which is hereby incorporated by reference herein in its entirety.

What is claimed is:

1. An image processing apparatus comprising:
a memory configured to store a program;
a processor configured to execute the program stored in the memory;
wherein the processor acquires a spatial frequency feature including a feature of fiber of an original in a read image obtained by a reading device reading the original,
wherein the processor determines whether a high frequency component which corresponds to a frequency equal to or higher than a predetermined frequency and is included in the acquired spatial frequency feature, has directivity, and
wherein the processor specifies a type of the original based on a result of the determination.

2. The image processing apparatus according to claim 1, wherein the processor further determines whether the high frequency component is included in the acquired spatial frequency feature, and determines whether the high frequency component has directivity in a case where it is determined that the high frequency component is included in the acquired spatial frequency feature.

3. The image processing apparatus according to claim 1, wherein the processor determines whether the high frequency component corresponds to directional properties of fiber in the original, based on whether the high frequency component has directivity.

4. The image processing apparatus according to claim 1, wherein the processor detects a region corresponding to a portion in the original from the read image to which a printing material is not applied, and wherein the processor acquires the spatial frequency feature corresponding to the detected region.

5. The image processing apparatus according to claim 1, wherein the processor specifies the type of the original is as a photographic paper in a case where it is determined that the high frequency component lacks directivity.

6. The image processing apparatus according to claim 1, wherein the processor determines whether the high frequency component has directivity, based on a flatness of a power spectrum distribution in a spatial frequency image of the acquired spatial frequency feature.

7. The image processing apparatus according to claim 6, wherein the processor determines that the high frequency component has directivity in a case where the flatness of the power spectrum distribution in the spatial frequency image is equal to or more than a predetermined flatness threshold value.

8. The image processing apparatus according to claim 4, wherein the processor detects a region in which an average luminance value is equal to or more than a predetermined luminance threshold value of the read image as the region.

9. The image processing apparatus according to claim 1, wherein the processor performs color conversion processing for the read image in accordance with the specified type of the original.

10. The image processing apparatus according to claim 9, wherein the processor sets a color conversion table in accordance with the type of the original and performs the color conversion processing by using the set color conversion table.

11. The image processing apparatus according to claim 1, wherein the processor roughly detects the type of the original based on a color reproduction range of the read image, wherein in a case where the processor cannot detect the type of the original, the processor specifies the type of original based on the determination.

12. The image processing apparatus according to claim 11, wherein the color reproduction range of the read image includes at least one of the maximum value of a chroma of the read image and the minimum value of a luminosity of the read image.

13. The image processing apparatus according to claim 12, wherein the processor detects the original as a photographic image in a case where the maximum value of the chroma of the read image is equal to or more than a predetermined chroma threshold value.

14. The image processing apparatus according to claim 12, wherein the processor detects the original as a photographic image in a case where the minimum value of the luminosity of the read image is equal to or less than a predetermined luminosity threshold value.

15. The image processing apparatus according to claim 1, wherein the processor specifies the type of the original as a plain paper in a case where it is determined that the high frequency component has directivity.

16. The image processing apparatus according to claim 3, wherein the processor determines whether fiber is included in the original, whether the high frequency component corresponds to directional properties of fiber in the original, and specifies the type of the original, based on whether fiber is included in the original.

17. An image processing method performed by a processor by executing a program stored in a memory, the method comprising:
   an acquisition step of acquiring a spatial frequency feature indicating a feature of fiber of an original in a read image obtained by a reading device reading the original;
   a determining step of determining whether a high frequency component which corresponds to a frequency equal or higher than a predetermined frequency and is included in the spatial frequency feature acquired in the acquisition step, has directivity; and
   a specification step of specifying a type of the original based on the determination in the determination step.

18. A non-transitory computer readable storage medium storing a program for causing a computer to perform as the image processing apparatus comprising:
   a memory configured to store a program;
   a processor configured to execute the program stored in the memory;
   wherein the processor acquires a spatial frequency feature including a feature of fiber of an original in a read image obtained by a reading device reading the original,
   wherein the processor determines whether a high frequency component which corresponds to a frequency equal to or higher than a predetermined frequency and is included in the acquired spatial frequency feature, has directivity, and
   wherein the processor specifies a type of the original based on a result of the determination.

* * * * *